July 13, 1926.                            1,592,507
                J. C. STUTZ
            WOODWORKING MACHINE
            Filed Nov. 13, 1924        2 Sheets-Sheet 1
Fig. 1.
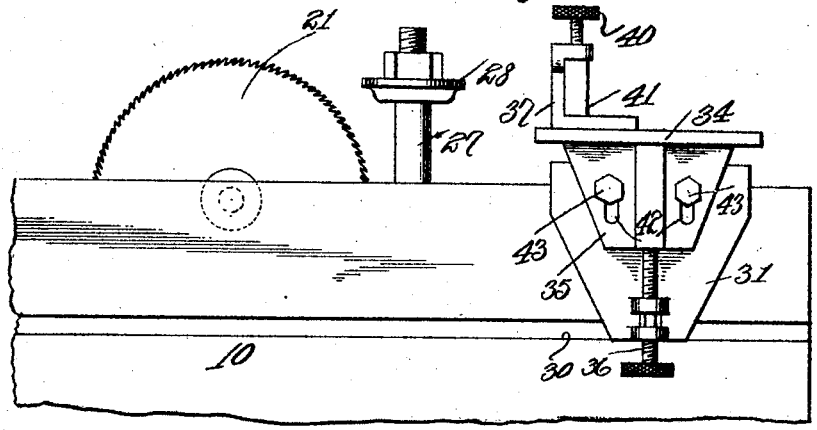
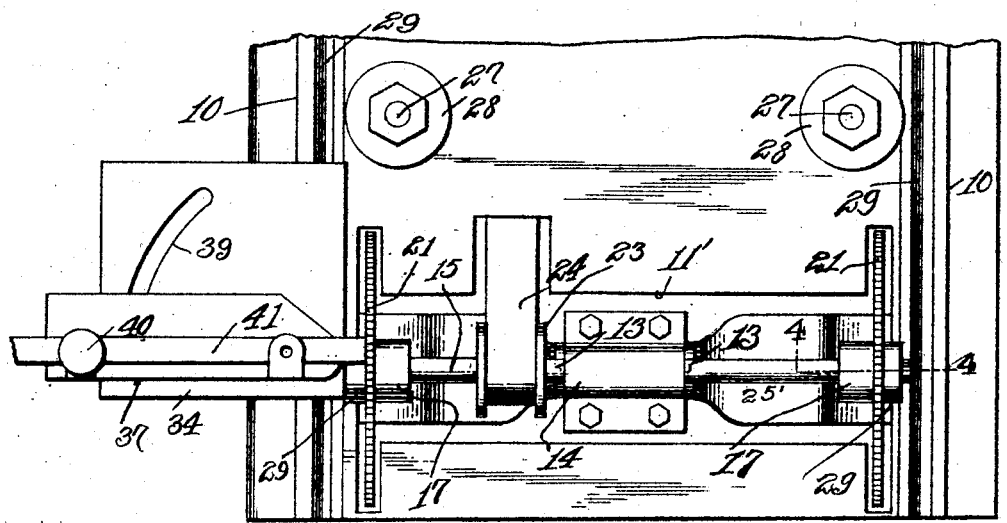
Fig. 3.
Inventor
John C. Stutz.
By Horace C. [Attorney signature]
Attorney

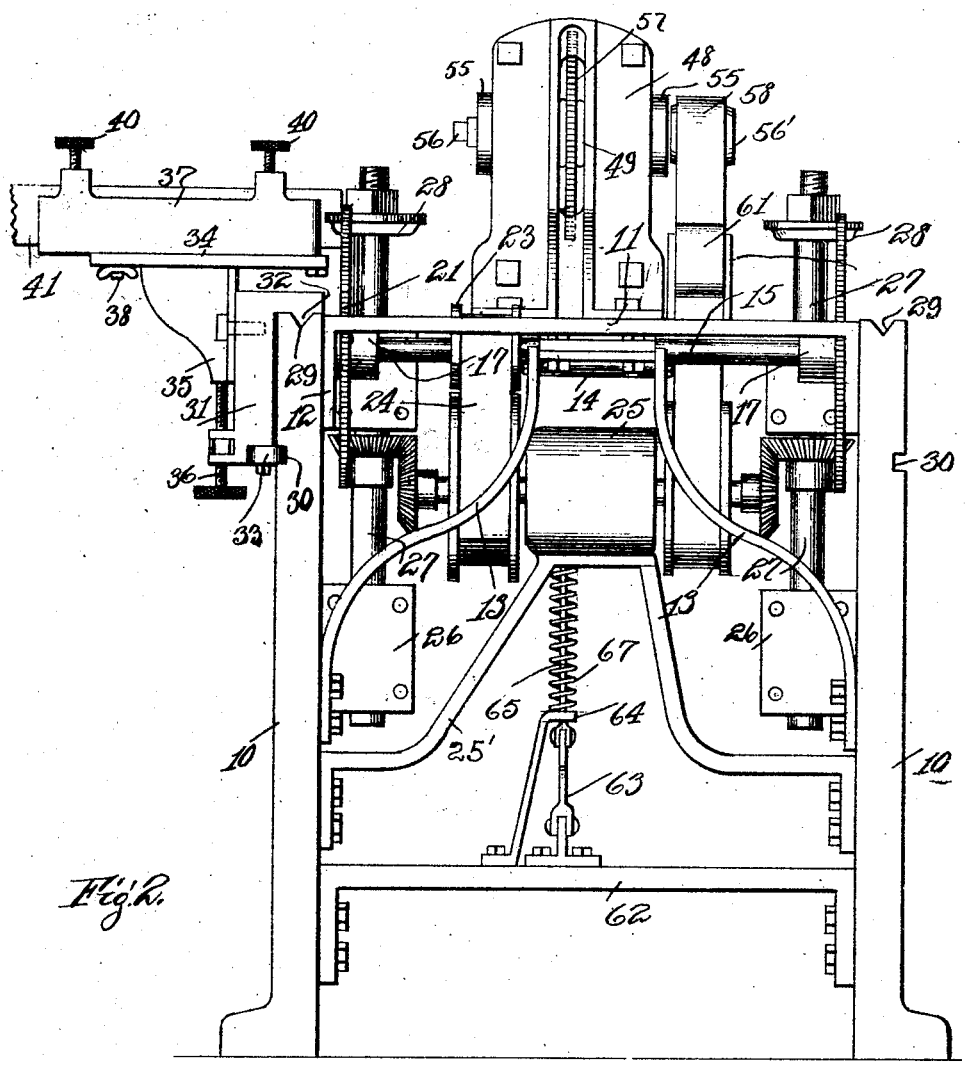

Patented July 13, 1926.

1,592,507

UNITED STATES PATENT OFFICE.

JOHN C. STUTZ, OF ALBUQUERQUE, NEW MEXICO.

WOODWORKING MACHINE.

Application filed November 13, 1924. Serial No. 749,677.

This invention relates to new and useful improvements in woodworking machines, and particularly to cut-off and coping machines.

One object of the invention is to provide a machine of this character by means of which the ends of mullion and muntin strips, of sash or door constructions, may be cut off and coped, in one operation, to produce the proper interlocking joints therebetween.

Another object is to provide a machine of this character which is readily convertible into a two spindle shaper or a coping device.

Another object is to provide a machine of this character wherein the bar stock may be cut off and coped in one operation, at the desired angles, whereby to provide for the proper fitting of the mullion and muntin strips to produce the desired outline or frame of the glass paneled door or window sash.

Another object is to provide a machine of this character which includes means for cutting off the end of the bar stock to the desired angle, before passing the stock to the coping cutters, thus permitting the strip or bar stock to be coped on the proper angle.

Other objects and advantages will be apparent from the following description when taken in connection with the accompanying drawings.

In the drawings:

Figure 1 is a side elevation of one end of a machine made in accordance with the present invention.

Figure 2 is an end view of the machine.

Figure 3 is a top plan view of the portion shown in Figure 1.

Figure 4 is an enlarged sectional detail view through one of the saws 21, showing the manner in which the saw is mounted on the shaft.

Referring particularly to the accompanying drawings, 10 represents a pair of side plates to which is secured the horizontal plate 11, forming the table top of the machine, said plate having the downwardly extending marginal flanges 12, which are secured to the inner faces of the side plates 10. Secured to the inner faces of the side plates 10, and extending inwardly and upwardly through the opening 11', in the table top, are the brackets 13, on the upper ends of which is mounted a bearing 14. Rotatably supported in this bearing 14 is a transverse shaft 15, and adjustably secured on each end of the shaft, by the set screws 16, is a sleeve 17. The outer end of each sleeve is formed with a threaded socket 18, in which is received the threaded stem of the nut 19, said stem also passing through the central opening 20 of the saw blade 21, said blade being of the circular type. The nut has a head 22 which is frictionally engaged against the outer face of the saw blade, to hold the blade in proper position. On the shaft 15, inwardly of one of the saw blades 21, is a belt wheel 23, driven by the belt 24, from the motor 25, which is mounted on the bracket 25', supported on the table beneath the top 11. Supported in suitable brackets 26, at opposite sides of the table, and between the side plates 10, are the vertical rotary spindles 27, and on the upper ends of the spindles are removably secured the coping cutters 28, or shaper knives or saws, the latter not being shown, but which will be well understood.

In the upper edge of each of the side plates 10, there is formed a longitudinally extending V-shaped groove 29, and extending longitudinally in the outer face of each side plate 10, is a longitudinal rectangular groove 30, said latter groove being in parallel relation to the table top and at a suitable distance from the top thereof. An angle plate 31 is disposed with its horizontal wing resting on the upper face of the side member 10, and on the lower face of this wing there is formed a longitudinal V-shaped rib 32, said rib fitting into the V-shaped groove 29, whereby the said plate is capable of easy sliding movement longitudinally of the table. Mounted in the lower portion of the depending wing of the plate 31 is a roller 33, which is disposed for rolling movement longitudinally in the angular groove 30. Disposed vertically for adjustment toward and away from the upper face of the angle plate 31, is a horizontal plate 34, said plate having a depending leg 35, which is movable upwardly and downwardly by the screw 36, carried by the vertical leg or wing of said plate 31. On the upper face of the plate 34 is pivotally mounted the horizontally swingable fence 37, said fence having a clamping screw 38 engaged through an arcuate slot 39, formed in the plate 34, concentric with the pivot of the fence. Vertically disposed screws 40 are carried by the upper portion of the fence to engage and hold the template or shoe 41, on the fence.

On and against this shoe the piece of work to be coped is placed, with its end projecting beyond the end of the template to a distance sufficient to permit proper operation of the cutter 28 thereon, the said end of the template or shoe being cut to conform to the cut to be made in the work by the cutter 28, and by reason of the fact that the work is held against the shoe, this cutout end will serve to prevent chipping of the wood, as the cutter passes through the adjacent edge thereof, and whereby a clean and smooth cut will be made through and across the end of the piece of work. By swinging the shoe around on its pivot to the desired angle, the cutter will form a coping cut, in the end face of the work, on the angle originally cut by the saw, so that this end of the work will properly fit an adjacent strip of a sash or door. The vertical leg 35 is formed with a pair of vertical slots 42, through which are engaged the clamping screws 43, which enter the vertical wing of the plate 31, for the purpose of securing the leg against displacement, after having been adjusted to the desired height by the screw 36.

The mullion and muntin material is placed against the template 41, and the carriage moved longitudinally of the table, to pass the end of the work into engagement with the saw 21, and then, when this cut has been made to the desired angle, the carriage is moved on toward the coping cutter, so that the cutter will cope the end of the work on the angle cut by the saw. This coping cut will be an inversion of the molding cut of the work, so that it will properly interfit with said molding cut of an adjacent molding strip, in a sash or door. The cut made by the coping cutter 28 is an undercut.

By removing the carriage from the track on the side member 10, the machine may be used as a two spindle shaper. The carriage may also be used on the other side of the machine, if desired.

Thus, after cutting off the end of a piece of work to the desired angle, with one of the saws 21, the piece of work is then placed against the template 41, and the carriage 31 moved longitudinally of the table, to pass the end of the work into engagement with the coping cutter 28, the said end of the work will be properly coped to fit an adjacent piece in a sash door construction.

What is claimed is:

1. A coping machine including a frame having a longitudinal groove in its upper face adjacent the side, an L-shaped member having a rib disposed for slidable movement in said groove, the side of the frame having a longitudinal groove, a roller on the L-shaped member movable in the last-named groove, a vertically adjustable member carried by the L-shaped member, and a work engaging fence angularly adjustable on the vertically adjustable member, and a cutter on the frame.

2. A machine of the class described including a support, a cutter on the support, a work carriage movable on the support transversely of the cutter, means for adjusting the work carriage angularly in a horizontal plane with respect to the cutter, a cut-off saw on the support in the path of the work on said carriage, a work support on the carriage and angularly adjustable in a horizontal plane with respect to the saw, and a common driving means for the cutter and the saw.

3. A coping machine including a frame having a grooved upper face, the frame having a longitudinal horizontal groove in its side beneath the first groove, an inverted L-shaped member having a rib on the lower face of its horizontal portion slidably disposed in the first groove, a roller carried by the extremity of the vertical leg of the L-shaped member and running in the second groove, a bracket supported on the L-shaped member for vertical adjustment, a screw on said member engaged with the bracket, and a horizontal pivoted work supporting platform on the upper end of the vertically adjustable member.

In testimony whereof, I affix my signature.

JOHN C. STUTZ.